(12) United States Patent
Manweiler

(10) Patent No.: US 9,704,245 B2
(45) Date of Patent: Jul. 11, 2017

(54) DETERMINING LOCALIZATION FROM IMAGES OF A VICINITY

(71) Applicant: International Business Machines Corporation, Armonk, NY (US)

(72) Inventor: Justin G. Manweiler, Somers, NY (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 14/828,552

(22) Filed: Aug. 18, 2015

(65) Prior Publication Data

US 2017/0053408 A1 Feb. 23, 2017

(51) Int. Cl.
| | | |
|---|---|---|
| G06K 9/00 | (2006.01) | |
| G06T 15/10 | (2011.01) | |
| G01C 3/14 | (2006.01) | |
| G06T 7/00 | (2017.01) | |
| G06F 17/30 | (2006.01) | |

(52) U.S. Cl.
CPC ........ G06T 7/0044 (2013.01); G06F 17/3053 (2013.01); G06F 17/30256 (2013.01); G06F 17/30268 (2013.01); G06T 2200/04 (2013.01); G06T 2207/10012 (2013.01); G06T 2207/20024 (2013.01); G06T 2207/20076 (2013.01)

(58) Field of Classification Search
CPC ......... G06T 7/0044; G06T 2207/10012; G06T 2207/20024; G06T 2200/04; G06T 2207/20076; G06T 7/0075; G06T 7/0022; G06F 17/3053; G06F 17/30256; G06F 17/30268; H04N 13/0239; H04N 2013/0081

USPC ........................ 382/100, 103, 154, 168, 170; 345/419-427; 356/12

See application file for complete search history.

(56) References Cited

U.S. PATENT DOCUMENTS

| | | | | |
|---|---|---|---|---|
| 6,819,783 | B2 * | 11/2004 | Goldberg | G03D 15/001 |
| | | | | 382/103 |
| 6,975,755 | B1 * | 12/2005 | Baumberg | G06K 9/4642 |
| | | | | 345/419 |

(Continued)

FOREIGN PATENT DOCUMENTS

EP 2442273 A1 4/2012

OTHER PUBLICATIONS http://hyperdex.org/, printed on May 31, 2015, pp. 1-2.

(Continued)

*Primary Examiner* — Sheela C Chawan
(74) *Attorney, Agent, or Firm* — Reza Sarbakhsh

(57) ABSTRACT

A method and system for determining a user's location in a pre-mapped environment from one or more images of the user's vicinity is provided. The method includes providing a probabilistic data structure derived from a second data structure, querying the second data structure for corresponding feature characteristics stored in the second data structure that respectively correspond to each feature characteristic from a plurality of feature characteristics, which may be a subset of an initial plurality of feature characteristics extracted from the one or more images from the user's vicinity, and identifying the user's location from the corresponding feature characteristics. The plurality of feature characteristics is determined by querying the probabilistic data structure.

20 Claims, 9 Drawing Sheets

(56) References Cited

U.S. PATENT DOCUMENTS

| | | | | |
|---|---|---|---|---|
| 7,965,904 B2* | 6/2011 | Kobayashi | ............ | G06K 9/3258 345/633 |
| 8,798,357 B2* | 8/2014 | Sinha | ................. | G06K 9/00664 345/419 |
| 8,849,838 B2* | 9/2014 | Wang | ................ | G06F 17/30979 707/721 |
| 2008/0313140 A1 | 12/2008 | Pereira et al. | | |
| 2016/0092727 A1* | 3/2016 | Ren | .................... | G06K 9/00369 382/103 |

OTHER PUBLICATIONS

Mell et al., "The NIST Definition of Cloud Computing", National Institue of Standards and Technology, Special Publication 800-145, Sep. 2011, pp. 1-7.

\* cited by examiner

DETERMINING LOCALIZATION FROM IMAGES OF A VICINITY

BACKGROUND

The present invention generally relates to determining localization from images of a vicinity, and more particularly to determining a user's location in a pre-mapped environment from images of the user's vicinity.

A camera's three-dimensional position and orientation in an environment may be determined from images captured by the camera (also known as image-based localization), for example, by simultaneous localization and mapping (SLAM) or by comparing key features in the images against a database of key features for the environment.

Bloom filters are probabilistic data structures that can be used to quickly and efficiently determine whether an element is present in a given set of elements. Bloom filters may return false positives, but cannot return false negatives. One or more hash functions may be used to query the Bloom filter. An increased number of hash functions may lower the number of false positives in the set; however, the increased number of hash functions may decrease the speed and efficiency of the Bloom filter.

SUMMARY

According to one embodiment, a method for determining a user's location in a pre-mapped environment from one or more images of the user's vicinity is provided. The method may include providing a first data structure, which is a probabilistic data structure derived from a second data structure, querying the second data structure for corresponding feature characteristics stored in the second data structure that respectively correspond to each feature characteristic from a plurality of feature characteristics, and identifying the user's location from the corresponding feature characteristics. The plurality of feature characteristics may be a subset of an initial plurality of feature characteristics extracted from the one or more images from the user's vicinity, and the plurality of feature characteristics is determined by querying the first data structure.

According to another embodiment, a computer program product for determining a user's location in a pre-mapped environment from one or more images of the user's vicinity is provided. The computer program product may include at least one computer readable non-transitory storage medium having computer readable program instructions for execution by a processor. The computer readable program instructions include instructions for providing a first data structure, which is a probabilistic data structure derived from a second data structure, querying the second data structure for corresponding feature characteristics stored in the second data structure that respectively correspond to each feature characteristic from a plurality of feature characteristics, and identifying the user's location from the corresponding feature characteristics. The plurality of feature characteristics may be a subset of an initial plurality of feature characteristics extracted from the one or more images from the user's vicinity, and the plurality of feature characteristics is determined by querying the first data structure.

According to another embodiment, a system for determining a user's location in a pre-mapped environment from one or more images of the user's vicinity is provided. The system may include at least one processor, at least one computer readable memory, at least one computer readable tangible, non-transitory storage medium, and program instructions stored on the at least one computer readable tangible, non-transitory storage medium for execution by the at least one processor via the at least one computer readable memory. The program instructions include instructions for providing a first data structure, which is a probabilistic data structure derived from a second data structure, querying the second data structure for corresponding feature characteristics stored in the second data structure that respectively correspond to each feature characteristic from a plurality of feature characteristics, and identifying the user's location from the corresponding feature characteristics. The plurality of feature characteristics may be a subset of an initial plurality of feature characteristics extracted from the one or more images from the user's vicinity, and the plurality of feature characteristics is determined by querying the first data structure.

BRIEF DESCRIPTION OF THE SEVERAL VIEWS OF THE DRAWINGS

The following detailed description, given by way of example and not intended to limit the invention solely thereto, will best be appreciated in conjunction with the accompanying drawings, in which.

The drawings are not necessarily to scale. The drawings are merely schematic representations, not intended to portray specific parameters of the invention. The drawings are intended to depict only typical embodiments of the invention. In the drawings, like numbering represents like elements.

DETAILED DESCRIPTION

Various embodiments of the present invention will now be discussed with reference to FIGS. 1 through 8, like numerals being used for like and corresponding parts of the various drawings.

According to one embodiment, a method is provided for determining a user's location in a pre-mapped environment from a plurality of images of the user's vicinity by determining the uniqueness of keypoints extracted from the plurality of images, which is determined by testing the keypoints against probabilistic data structures (e.g., Bloom filters) derived from a global data store of keypoints acquired from the pre-mapped environment, and querying the global data store with the most unique keypoints extracted from the plurality of images. The probabilistic data structures may quickly determine the presence of an element in a set at the expense of possibly generating false positives. The methods, products, and systems disclosed herein may be useful in determining a user's location in areas lacking GPS service, e.g., inside buildings, in geographic areas with poor or no GPS service, etc.

Figure 1:
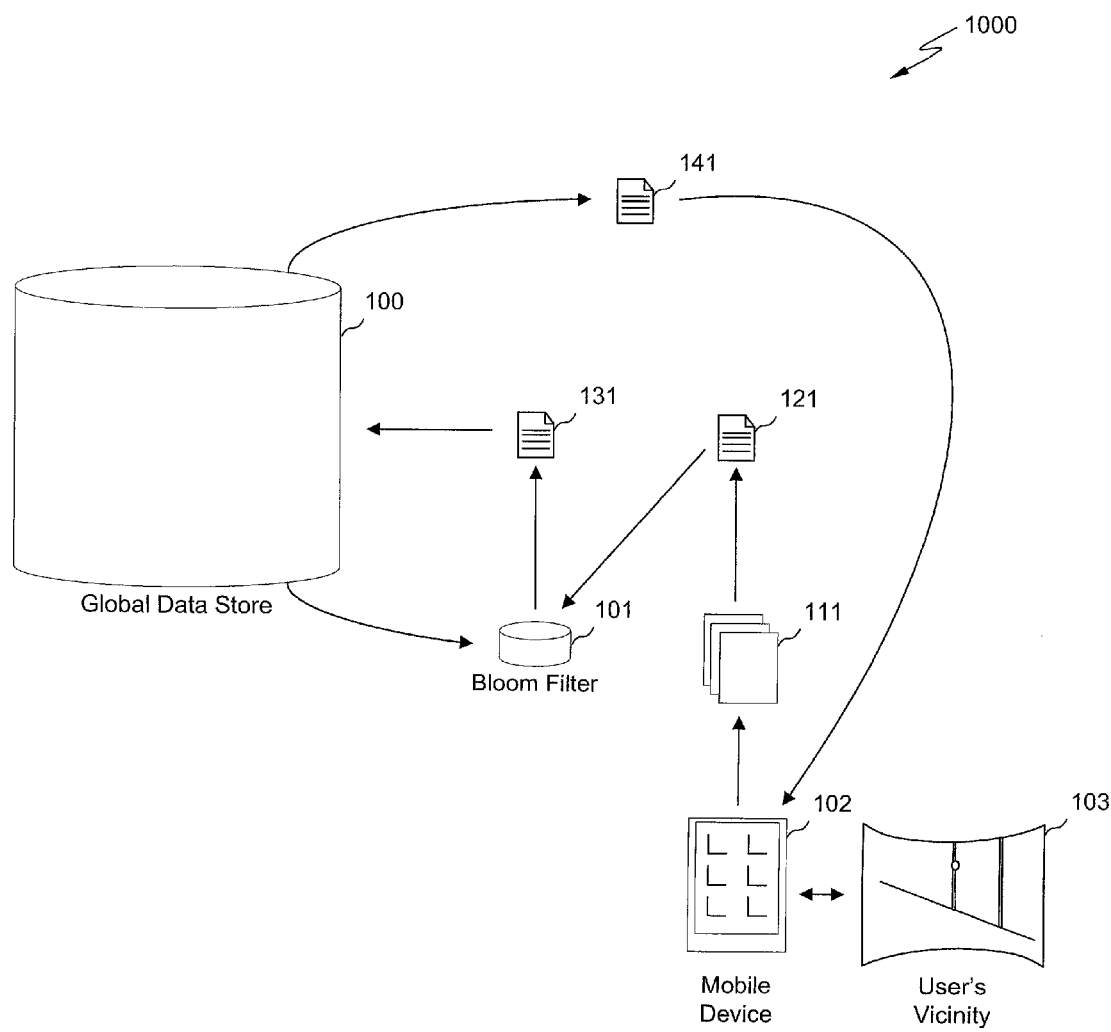
FIG. 1 is a block diagram illustrating a system employing a method for determining a user's location from a plurality of images of the user's vicinity, according to an embodiment.

FIG. 1 depicts a block diagram illustrating a system 1000 employing an exemplary method for determining a user's location in a pre-mapped environment from a plurality of images of the user's vicinity, according to an embodiment disclosed herein. Global data store 100 may contain 3D mappings of image keypoints of the pre-mapped environment. The pre-mapped environment may be mapped or "wardrived," e.g., by taking many photos of the desired environment and creating a 3D map with a technique such as Structure from Motion technique ("SfM") or by walking around the desired environment with a commercially available 3D mapping product, such as a Google® Tango™, and creating a 3D map with a technique such as Simultaneous Localization and Mapping ("SLAM"). Global data store 100 may contain 3D mappings from several other pre-mapped environments, e.g., other buildings. A Bloom filter 101 (an exemplary probabilistic data structure) is generated from the 3D mappings in global data store 100. A user takes imagery (e.g., video and/or pictures) from the user's vicinity 103 with the user's mobile device 102 (e.g., using an onboard imaging device/camera on the mobile device), which is captured as a plurality of images 111 of the user's vicinity.

A first plurality of feature characteristics 121 (e.g., high-quality keypoints) are extracted from the plurality of images 111 of the user's vicinity. Feature characteristics can include keypoints, coordinates, vectors, or other descriptors known in the art, and may exist in high-dimensional spaces (e.g., 128 dimensions). Each feature characteristic from the first plurality of feature characteristics 121 is tested against the Bloom filter 101. In response to each query, the Bloom filter 101 returns a number of first corresponding feature characteristics that respectively correspond to each feature characteristic from the first plurality of feature characteristics 121, which reflects an assessment of uniqueness for each feature characteristic from the first plurality of feature characteristics 121. For example, a more unique feature characteristic (from the first plurality of feature characteristics 121) will have fewer corresponding feature characteristics (returned by the Bloom filter 101).

A ranked list of each feature characteristic from the first plurality of feature characteristics 121 having a non-zero number of the first corresponding feature characteristics may be generated. The ranked list may be based on the number of first corresponding feature characteristics, e.g., from least to greatest number or most unique to least unique. From the ranked list, a second plurality of feature characteristics 131 is selected, which is a subset of the most unique feature characteristics from the first plurality of feature characteristics 121. For example, the first plurality of the feature characteristics 121 may include several hundred to several thousand feature characteristics (i.e., keypoints) and the second plurality of feature characteristics 131 may be a relatively small number (e.g., 5-50) of the most unique keypoints from the first plurality of the feature characteristics 121.

Each feature characteristic from the second plurality of feature characteristics 131 is tested against the global data store 100. In response to each query, the global data store 100 returns second corresponding feature characteristics (e.g., 3D points) that respectively correspond to each feature characteristic from the second plurality of feature characteristics 131 (i.e., the relatively small subset of the most unique keypoints from the first plurality of feature characteristics 121). From the second corresponding feature characteristics, the user's location in the pre-mapped environment 141 is identified, and this information may be sent to the user's mobile device 102.

Figure 2:
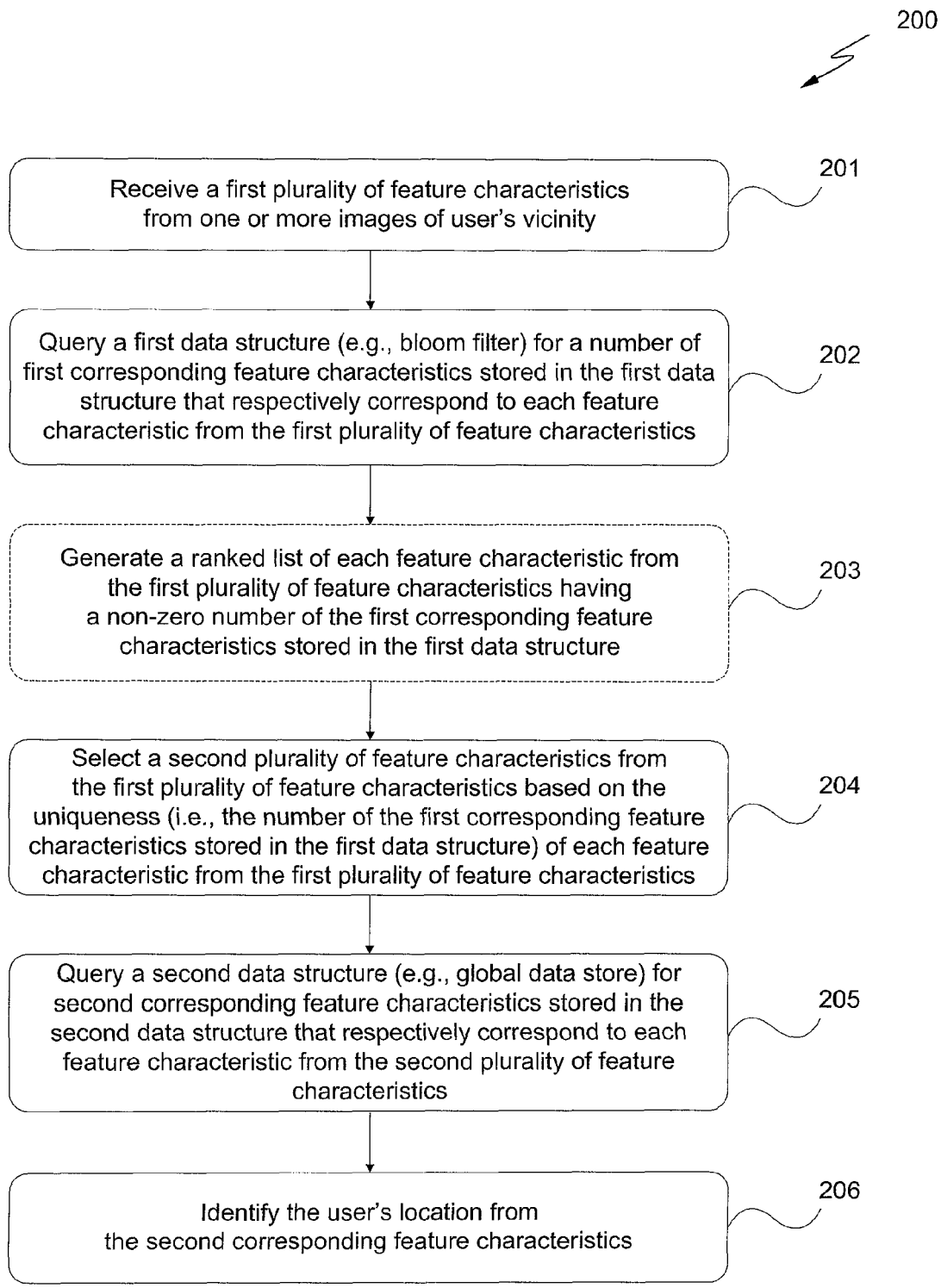
FIGS. 2-4 are flowcharts illustrating methods for determining a user's location from one or more images of the user's vicinity, according to various embodiments.

FIG. 2 depicts a flowchart illustrating an exemplary method 200 for determining a user's location from one or more images of the user's vicinity, according to an embodiment disclosed herein. At 201, according to one method embodiment, a system, apparatus, or node (e.g., a user's mobile device, a server, a computing module, etc.) receives a first plurality of feature characteristics (e.g., high-quality keypoints), which are extracted from the one or more images of the user's vicinity. The feature characteristics may be extracted using any method or technique known to or contemplated by those skilled in the art, including, but not limited to, invariant feature detecting algorithms, such as Scale-Invariant Feature Transform ("SIFT"), Speeded Up Robust Features ("SURF"), and/or non-invariant feature detecting algorithms, such as Features from Accelerated Segment Test ("FAST").

At 202, the first plurality of feature characteristics are used to query a first data structure (e.g., a Bloom filter derived from a global data store of keypoints) for a number of first corresponding feature characteristics that respectively correspond to each feature characteristic from the first plurality of feature characteristics. This step may determine how unique each of the feature characteristics from the first plurality of feature characteristics is relative to the keypoints stored in the global data store.

At 203, a ranked list of each feature characteristic from the first plurality of feature characteristics having a non-zero number of the first corresponding feature characteristics is generated. The feature characteristics are listed in the ranked list according to the number of the first corresponding feature characteristics, e.g., from least to greatest number, or from the most unique to the least unique.

At 204, a second plurality of feature characteristics (i.e., a subset of high-quality keypoints) is selected from the first plurality of feature characteristics based on the uniqueness of each feature characteristic from the first plurality of feature characteristics. The second plurality of feature characteristics is a subset including the most unique feature characteristics from the first plurality of feature characteristics. This step may reduce the number of feature characteristics (or keypoints from the one or more images of the user's vicinity) to the most important or unique feature characteristics that will be tested against the global data store of keypoints, which may reduce the total time and amount of resources required to identify the user's location within the pre-mapped environment. It will be appreciated that the ranked list (generated in step 203) may help facilitate the selection of the most unique keypoints, i.e., the second pluralilty of feature characteristics (in step 204). In some embodiments, the method disclosed herein may be practiced without step 203 or generating a ranked list as described in step 203.

At 205, the second plurality of feature characteristics are used to query a second data structure, e.g., the global data store, which may contain a number of keypoints that may be several orders of magnitude greater than the number of keypoints contained in the first data structure, e.g., the Bloom filters used to cull the first plurality of feature characteristics to the most unique feature characteristics. In some embodiments, the global data store may have a filesize of several terabytes, whereas the Bloom filters disclosed herein may have a filesize on the order of megabytes. The second data structure (e.g., the global data store) is queried for second corresponding feature characteristics that respectively correspond to each of the feature characteristics from the second plurality of feature characteristics (which were determined in steps 202-204). The global data store may return one or more keypoints (e.g., 3D coordinates in the pre-mapped environment) stored in the global data store that correspond to each of the inputted feature characteristics (which are from the second plurality of feature characteristics).

At 206, the user's location in the pre-mapped environment is identified among the second corresponding feature characteristics determined in step 205. In some embodiments, the identification of the user's location may include applying spatial clustering analyses on the returned keypoints. In further embodiments, two or more returned keypoints may be used to determine the relative angle of observation with which the user observed (via the one or more images of the user's vicinity) the feature characteristics (from the first plurality of feature characteristics) that correspond to the two or more returned keypoints.

Figure 3:
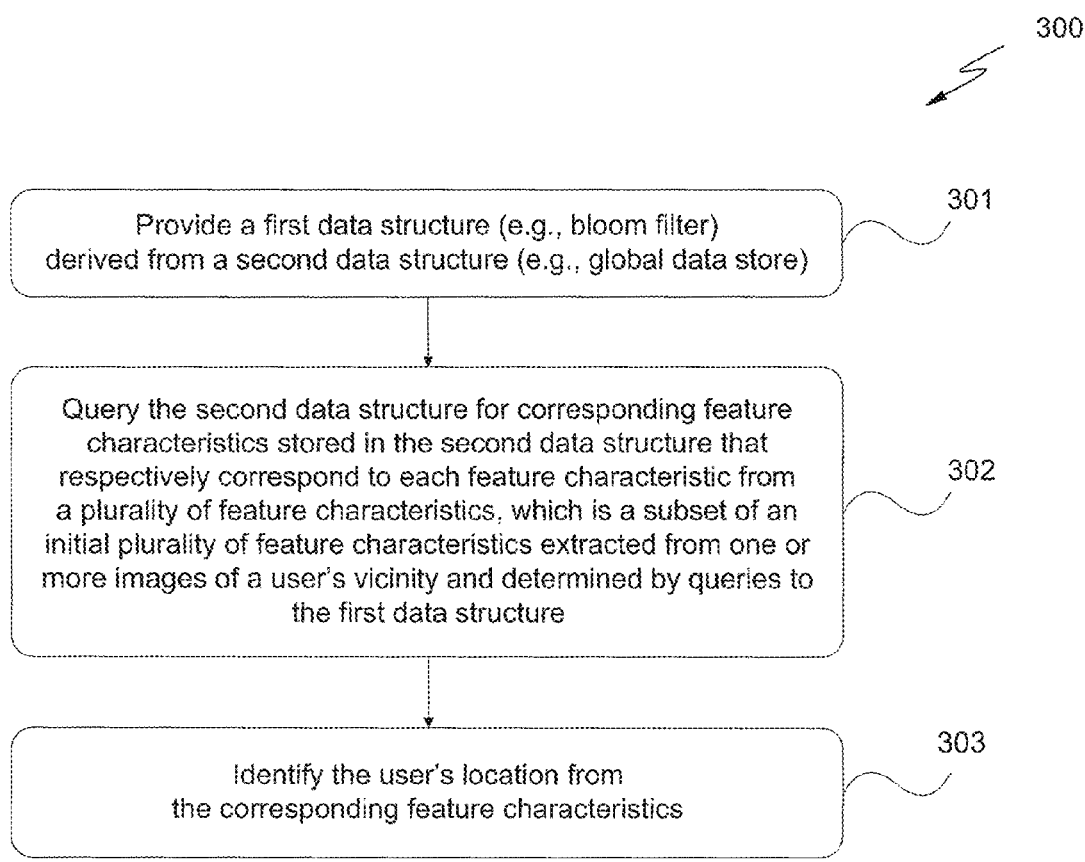

FIG. 3 depicts a flowchart illustrating another exemplary method 300 for determining a user's location from one or more images of the user's vicinity, according to an embodiment disclosed herein. At 301, a first data structure, which may be a probabilistic data structure (e.g., a Bloom filter) derived from a second data structure (e.g., a global data store) is provided. For example, one or more Bloom filters are generated from a global data store of keypoints including keypoints for a desired pre-mapped environment. The Bloom filters may be provided to the user as part of an application used for localization determination, which the user may download onto and run on a mobile device. The Bloom filters may also be provided to the user's mobile device as refreshed or updated or additional Bloom filters.

At 302, the second data structure (e.g., the global data store) is queried for corresponding feature characteristics stored in the second data structure (e.g., the global data store) that respectively correspond to each feature characteristics from a plurality of feature characteristics, which may be a subset of an initial plurality of feature characteristics extracted from one or more images of a user's vicinity. The subset of feature characteristics is determined based on queries to the first data structure (e.g., the Bloom filter). For example, a server (or service provider, including, e.g., a localization service provider) may receive a relatively small subset of keypoints culled from keypoints originally extracted from one or more images of a user's vicinity, and the server may query the global data store (i.e., the second data structure) for keypoints stored in the global data store that correspond to each of the keypoints in the received subset of keypoints. The corresponding keypoints stored in the global data store may be further analyzed to determine the user's location within the pre-mapped environment.

In one embodiment, the determination of the subset of feature characteristics based on queries to the first data structure includes querying the first data structure for a number of initial corresponding feature characteristics stored in the first data structure that respectively correspond to each feature characteristic from the initial plurality of feature characteristics extracted from one or more images of the user's vicinity, generating a ranked list of each feature characteristic having a non-zero number of initial corresponding feature characteristics, and selecting the plurality of feature characteristics from the ranked list. The plurality of feature characteristics contains feature characteristics from the initial plurality of feature characteristics having a least number of initial corresponding feature characteristics.

At 303, the user's location within a pre-mapped environment is identified from the corresponding feature characteristics stored in the second data structure (e.g., the global data store). The identification of the user's location may be carried out by any of the spatial, visual, or probability analysis techniques disclosed or contemplated herein. For example, in one embodiment, spatial clustering analysis may be applied to the corresponding feature characteristics. In a further embodiment, an angle of observation with which the user observed each of the feature characteristics from the initial plurality of feature characteristics that corresponds to the corresponding feature characteristics may be determined. In a yet further embodiment, a triangulation analysis may be applied to the corresponding feature characteristics.

Figure 4:
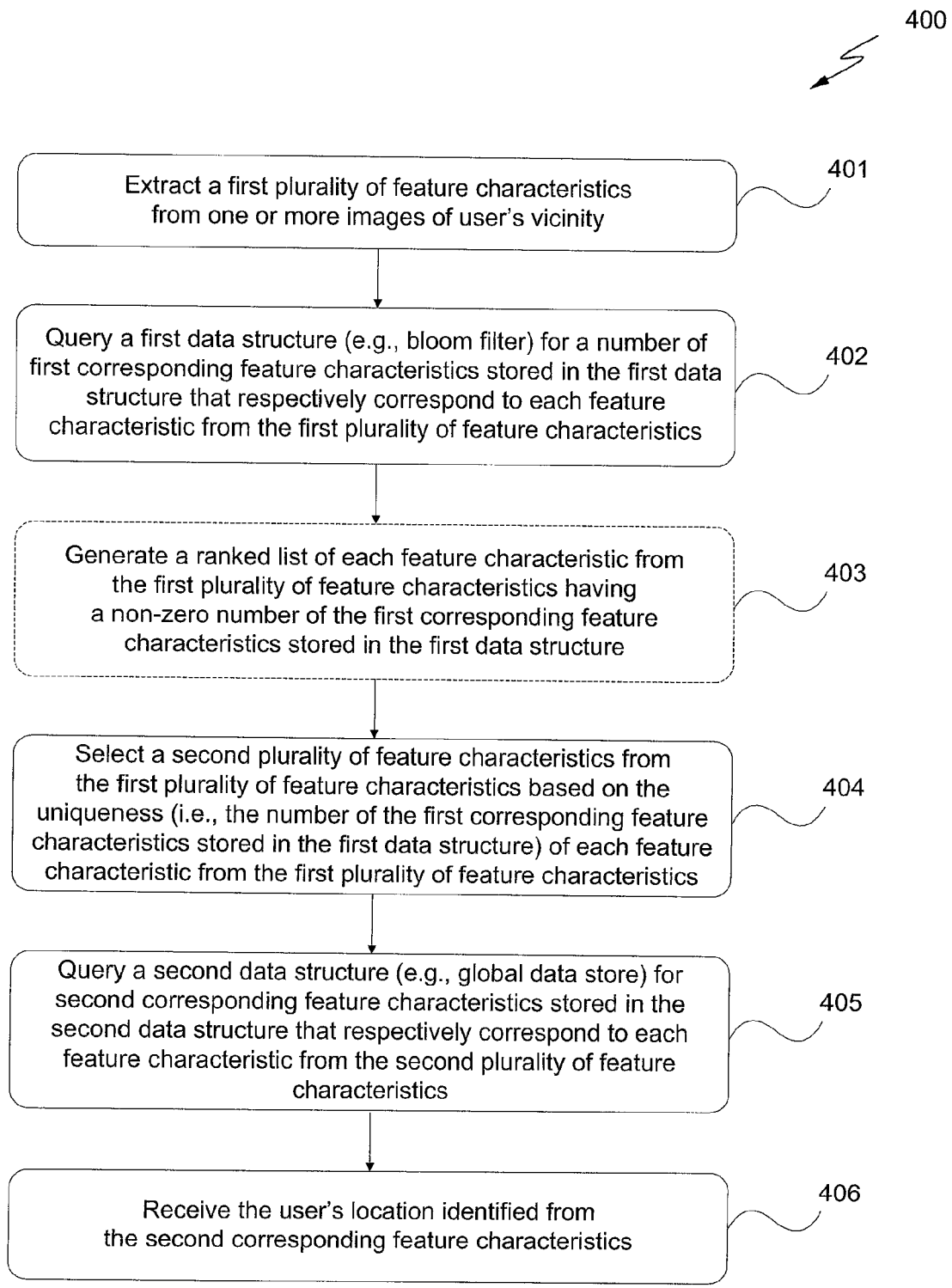

FIG. 4 depicts a flowchart illustrating another exemplary method 400 for determining a user's location from one or more images of the user's vicinity, according to an embodiment disclosed herein. At 401, a first plurality of feature characteristic is extracted from one or more images of a user's vicinity. In one embodiment, the one or more images of the user's vicinity may be taken with a mobile device. The extraction of the first plurality of feature characteristics may utilize a feature detection algorithm, e.g., SIFT, SURF, FAST. In one embodiment, the extractions may be performed on the user's mobile device.

At 402, the first plurality of feature characteristics are used to query a first data structure (e.g., a Bloom filter derived from a global data store of keypoints) for a number of first corresponding feature characteristics that respectively correspond to each feature characteristic from the first plurality of feature characteristics. At 403, a ranked list of each feature characteristic from the first plurality of feature characteristics having a non-zero number of the first corresponding feature characteristics may optionally be generated. At 404, a second plurality of feature characteristics (i.e., a subset of high-quality keypoints) is selected from the first plurality of feature characteristics based on the uniqueness of each feature characteristic from the first plurality of feature characteristics. In one embodiment, the second plurality of feature characteristics is selected from the ranked list (generated in step 403). In one embodiment, at least one of querying the first data structure, generating the ranked list, and selecting the second plurality of feature characteristics may be performed on a mobile device. In a further embodiment, at least one of querying the first data structure, generating the ranked list, and selecting the second plurality of feature characteristics may be performed by a graphical processing unit on the mobile device.

At 405, the second plurality of feature characteristics are used to query a second data structure, e.g., the global data store, which may contain a number of keypoints that may be several orders of magnitude greater than the number of keypoints contained in the first data structure, e.g., the Bloom filters used to cull the first plurality of feature characteristics to the most unique feature characteristics. The second data structure may be provided as a cloud-based service. Queries to the second data structure may be performed by any known or contemplated form of electronic communication, e.g., Wi-Fi, VPN, LAN, Bluetooth®, etc.

At 406, the user's location in the pre-mapped environment is received, e.g., by the user's mobile device. Reception of the user's location may be performed by any known or contemplated form of electronic communication, e.g., Wi-Fi, VPN, LAN, Bluetooth®, etc.

In one embodiment, the above steps 401-406 may be performed on a user's mobile device. In one embodiment, the above steps 401-406 may be performed by an application executed on one or more processors, e.g., on the user's mobile device.

Figure 5A:
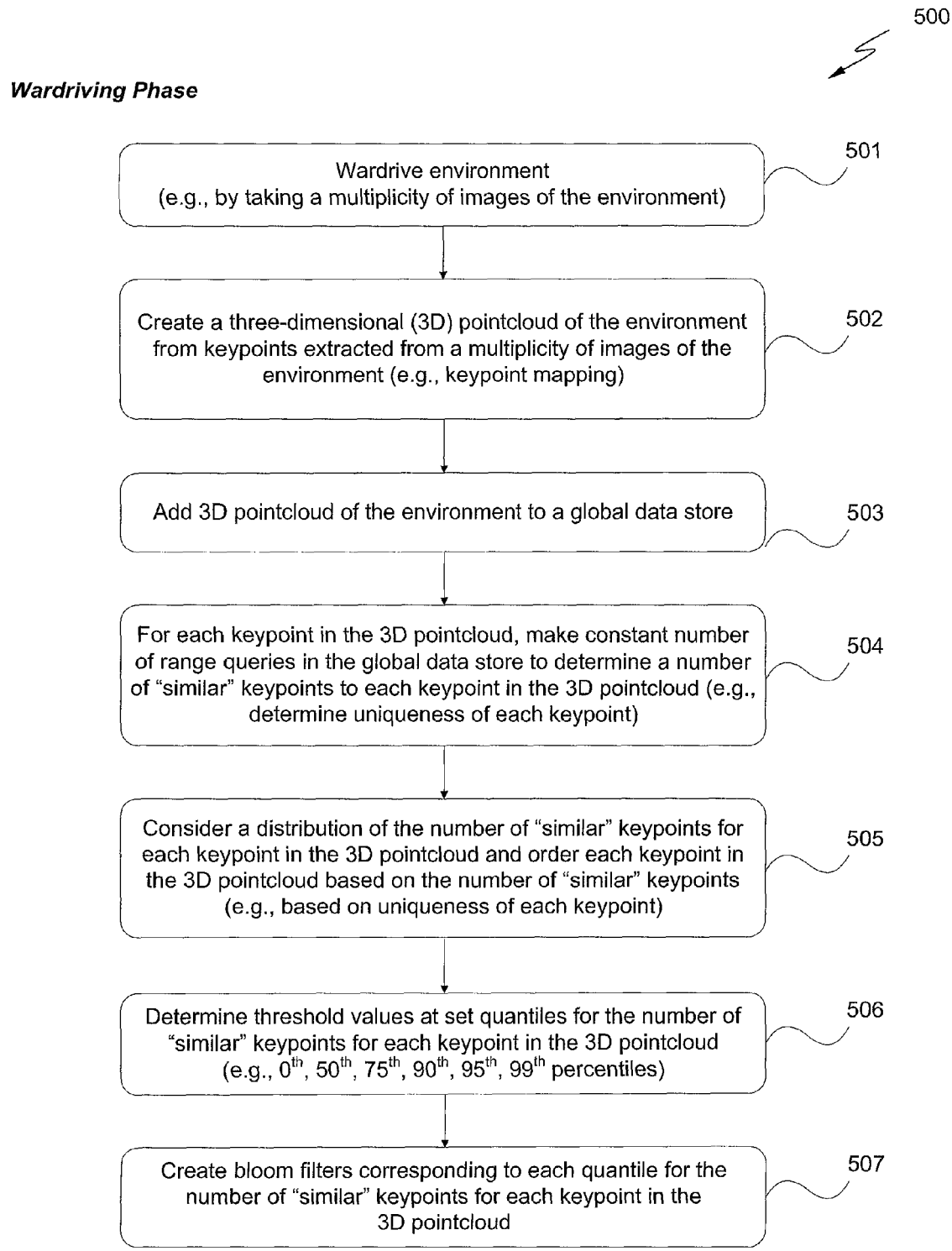
FIGS. 5A and 5B are flowcharts illustrating a method for determining a user's location from a plurality of images of the user's vicinity including detail for a wardriving phase and a usage phase, according to an embodiment.
Figure 5B:
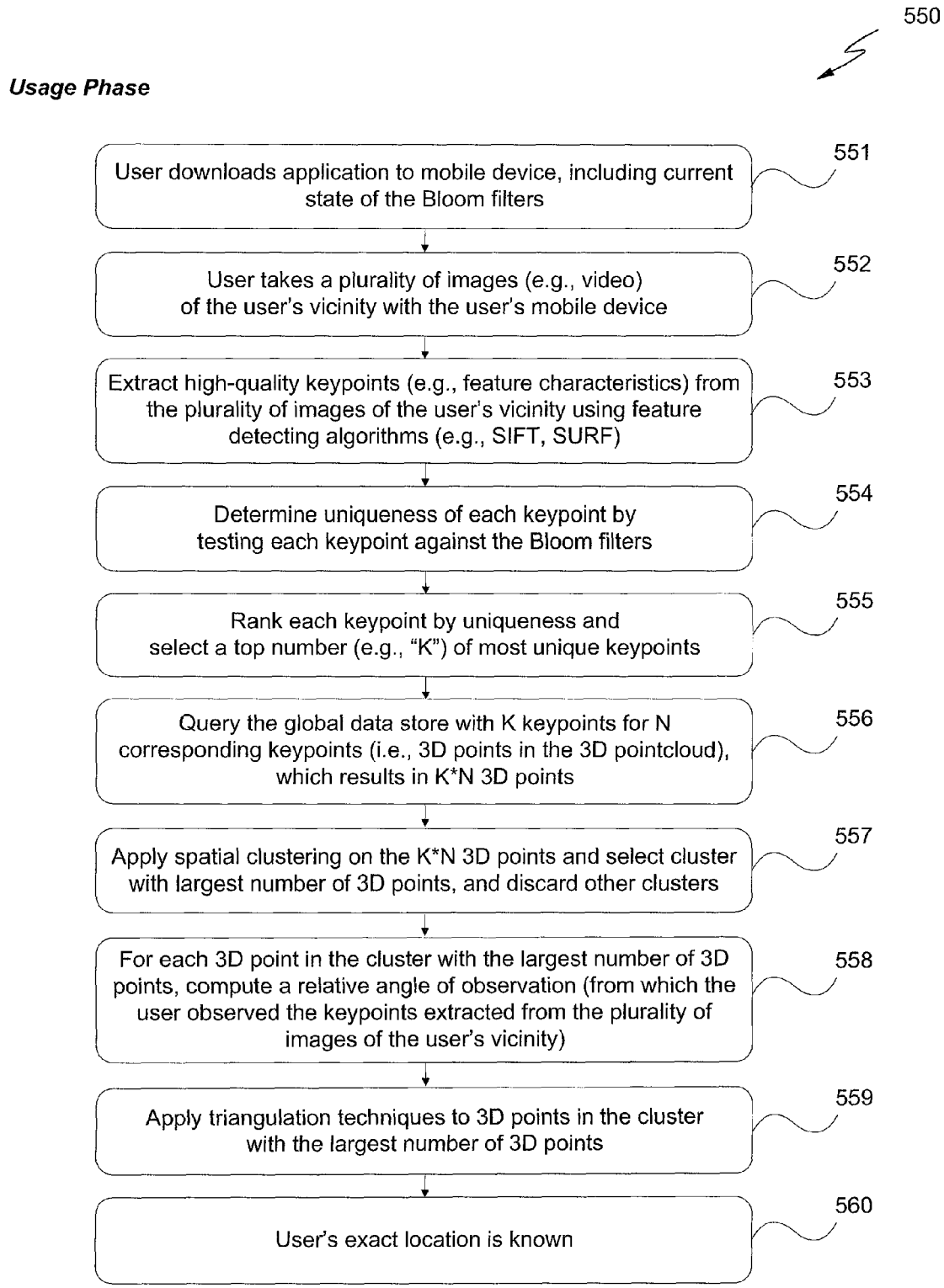
Figure 6:
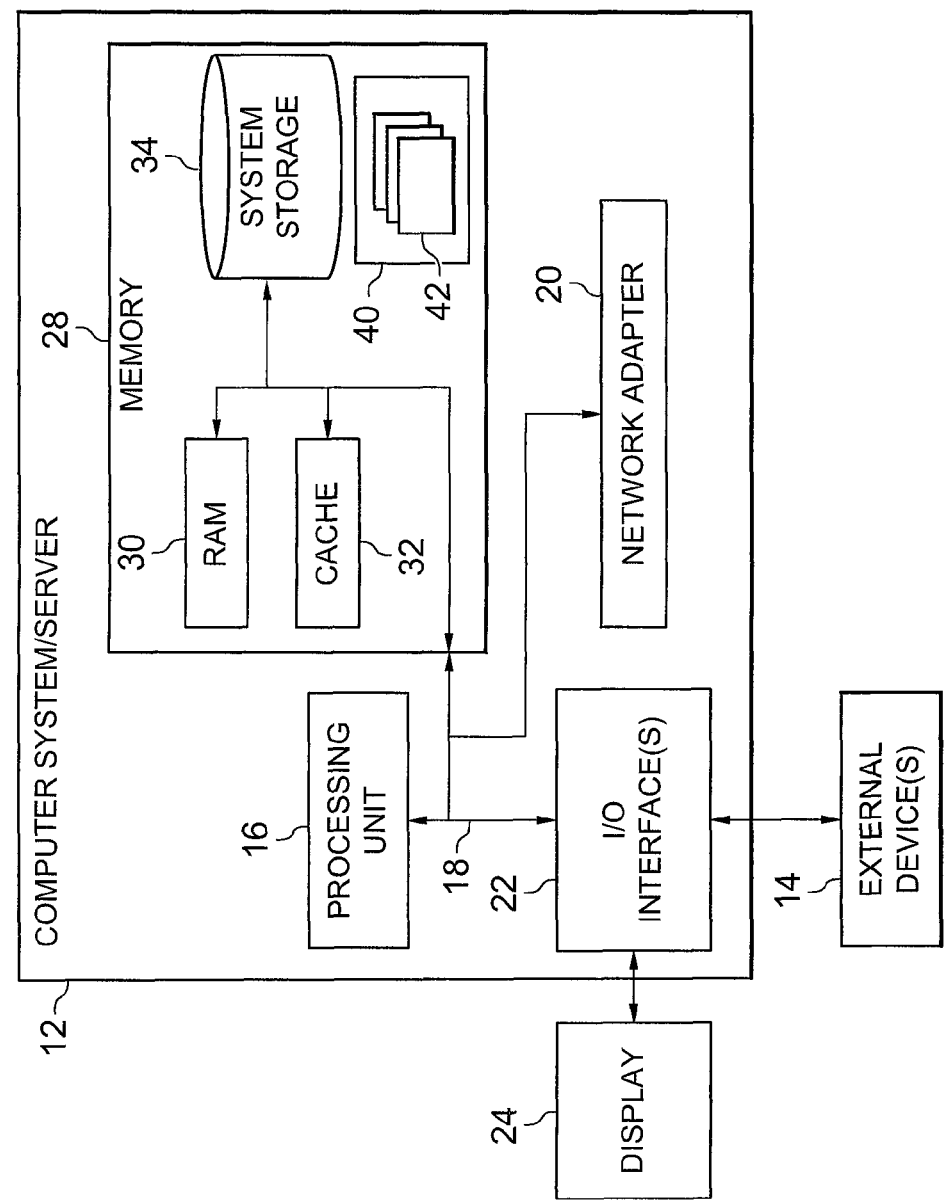
FIG. 6 is a block diagram illustrating a cloud computing node, according to an embodiment.
Figure 7:
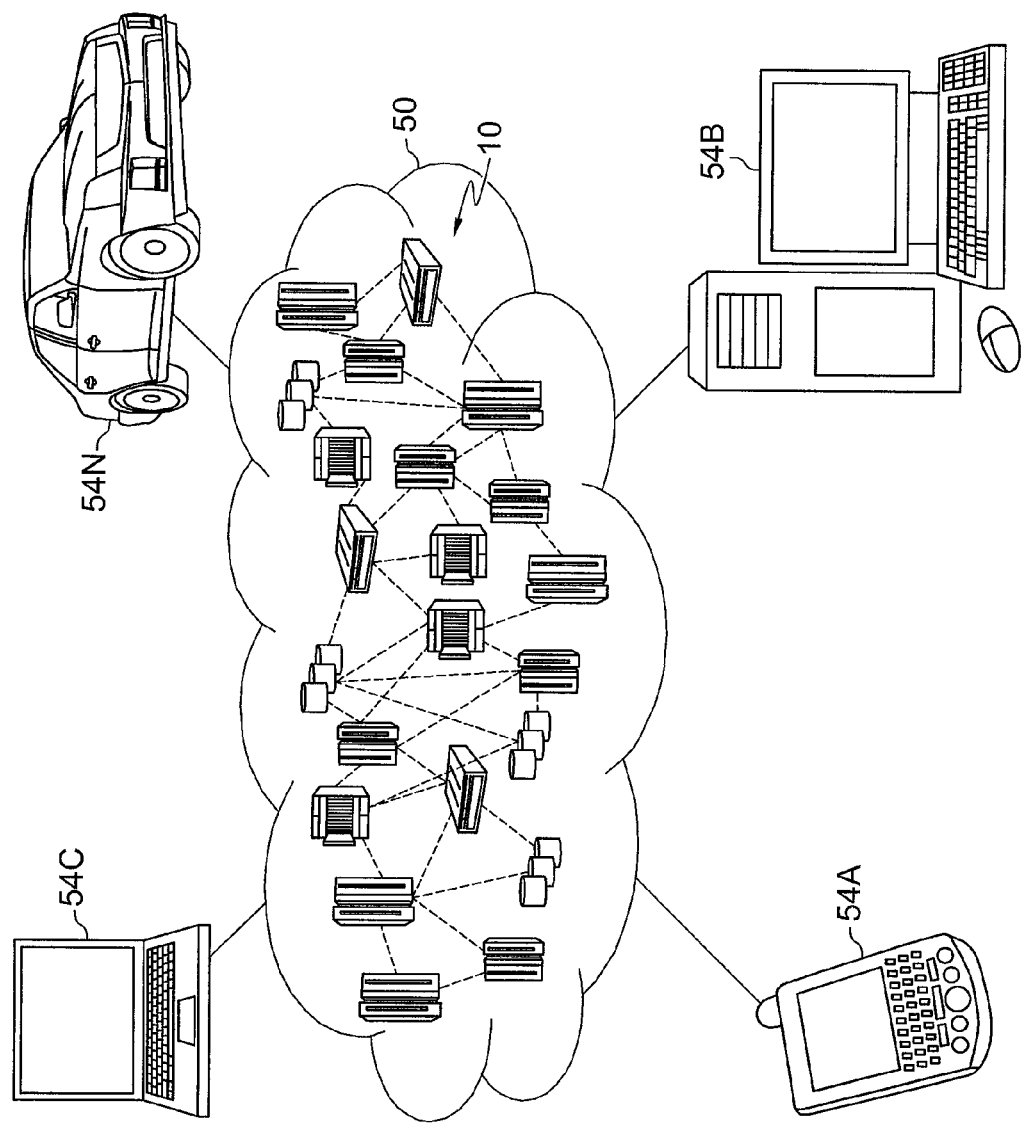
FIG. 7 depicts a cloud computing environment, according to an embodiment.

FIGS. 5A and 5B depict a flowchart illustrating another exemplary embodiment. Specifically, FIG. 5A illustrates a wardriving phase 500 of an exemplary method embodiment disclosed herein, and FIG. 5B illustrates a usage phase 550 of an exemplary method embodiment disclosed herein. Referring to FIG. 5A, at 501, a desired environment is mapped (or pre-mapped) or "wardrived" by taking a multiplicity of images of the environment. The multiplicity of images may include video and/or photographs of the environment.

At 502, a 3D pointcloud of the desired environment (e.g., utilizing SfM, SLAM) is created, which includes image keypoints of the environment.

At 503, the 3D pointcloud of the desired environment is added to a global data store. The global data store may contain 3D pointclouds for a plurality of pre-mapped environments, e.g., a plurality of buildings and/or geographic locations. The global data store may be enormous due to the amount of data and dimensions associated with the stored data. A suitable candidate for such a global data store is HyperDex (http://hyperdex.org/), which is an open source distributed NoSQL data store space. In some embodiments, the data stores are capable of handling high-dimensional spaces (e.g., 128-dimensions).

At 504, for each keypoint in the 3D pointcloud of the desired environment, a constant number of range queries are made in the global data store to determine a number of "similar" keypoints that are similar to each keypoint in the 3D pointcloud. It will be appreciated that determining "similarity" of keypoints may be based on preconfigured thresholds, e.g., keypoints with descriptors having less than a predetermined distance between them. This step may determine the uniqueness of each keypoint in the 3D pointcloud. In one embodiment, a comparison scan (e.g., an O(n log n) scan) is periodically performed on the entire global data store. For each keypoint, a constant number of range queries (e.g., O(log n)) are made in the keypoint descriptor space.

At 505, the distribution of the number of "similar" keypoints for each keypoint in the 3D pointcloud is considered. The keypoints may be ordered according to the number of "similar" keypoints each keypoint has. In other words, each keypoint in the 3D pointcloud may be ordered according to its uniqueness.

At 506, threshold values at set quantiles for the number of "similar" keypoints for each keypoint in the 3D pointcloud may be determined. For example, threshold values may be determined for the $0^{th}$, $50^{th}$, $75^{th}$, $90^{th}$, $95^{th}$, and/or $99^{th}$ percentiles.

At 507, Bloom filters are created that correspond to each desired quantile for the number of "similar" keypoints for each keypoint in the 3D pointcloud. Each Bloom filter encodes keypoints that meet a preconfigured set of criteria ("uniqueness criterion") corresponding to the respective quantile. In one embodiment, the encoding is a discretized encoding of a keypoint range. For example, a keypoint that appears only once in the 3D pointcloud would be encoded in every Bloom filter; however, a common keypoint, e.g., a corner of a bathroom tile, might only appear in the Bloom filters associated with the $0^{th}$ and $50^{th}$ percentiles. The Bloom filters can be refreshed or regenerated as data is added to the global data store, e.g., additional keypoints extracted from additional images of the desired environment, additional 3D pointclouds from additional environments.

Referring to FIG. 5B, at 551, a user downloads an application for determining a user's location in a pre-mapped environment in accordance with the methods and systems disclosed herein. In one embodiment, the user downloads the application including the current state of the Bloom filters derived from the global data store. In one embodiment, the user downloads the application to a mobile device.

At 552, the user takes a plurality of images (e.g., video) of the user's vicinity the user's mobile device. Imagery of the user's vicinity (i.e., a plurality of images of the user's vicinity) may be captured with a video or photograph function on a mobile device, and in particular, with a video/camera lens, one or more processors, and a memory on the mobile device. The imagery of the user's vicinity may be captured with a sweeping motion of the mobile device. For example, the user may sweep the vicinity in a circular motion to capture 360 degrees of imagery surrounding the user, or the user may partially sweep the vicinity (i.e., less than a complete 360 degree rotation). The user may also sweep or take multiple photographs at various tilt angles or orientations. In other words, the plurality of images of the user's vicinity do not have to be tracked in a uniform arc. For example, the user may take an overhead shot of a fixture hanging from the ceiling and take additional shots/video of a hallway. In one embodiment, data from an onboard accelerometer or gyroscope may be recorded during the capture of the imagery of the user's vicinity and the accelerator/gyroscope data may be used in subsequent analyses, e.g., determining the relative angle(s) of observations of various keypoints, etc.

At 553, high-quality keypoints (i.e., feature characteristics) are extracted from the plurality of images of the user's vicinity. In some embodiments, the extraction of the keypoints utilize a feature detection algorithm, e.g., SIFT, SURF, FAST. In one embodiment, the computational time to process the extraction of the keypoints may be O(1,000) to O(10,000) per image.

At 554, the uniqueness of each keypoint extracted from the plurality of images of the user's vicinity may be determined by testing each keypoint against the Bloom filters provided with the application. For example, the Bloom filters may be queried with each keypoint for a number of corresponding keypoints stored in each Bloom filter.

At 555, each keypoint from the plurality of images of the user's vicinity may be ranked in order of uniqueness and the most unique keypoints may be selected for further analysis. In one embodiment, a relatively small number ("K") of the most unique keypoints is selected, e.g., 5-50 keypoints.

At 556, the global data store may be queried with a selection of the most unique keypoints extracted from the plurality of images of the user's vicinity. In one embodiment, the global data store may be queried with K keypoints (i.e., the most unique keypoints). The global data store may return "N" number of corresponding keypoints (i.e., 3D points in the 3D pointcloud), which results in K*N 3D points. In one embodiment, queries to the global data store may be trivially parallelizable, for example, when the global data store is a HyperDex data store. In one embodiment, the total query latency may be on the order of milliseconds to seconds.

At 557, a spatial clustering analysis may be applied to the K*N 3D points to identify clusters of 3D points. The cluster with a largest number of 3D points is selected. The other clusters are discarded (i.e., disregarded). The true location of the queried keypoint in the global data store (e.g., in the 3D pointcloud of the pre-mapped environment) may likely have the largest number of highly-unique keypoint matches. It may also be likely that false positive matches would be spatially dispersed as outliers from the true location.

At 558, for each 3D point in the selected cluster, a relative angle of observation from which the user observed the original keypoints (extracted from the plurality of images of the user's vicinity) is computed. For example, if two keypoints are extracted from the same image of the user's vicinity (i.e., the same frame), the exact angular disparity may be calculated. In one embodiment, the method may be optimized to ensure that two keypoints are extracted from the same image. In yet further embodiments, the determination of the relative angle of observation may be determined using data from an accelerometer or gyroscope on board the user's mobile device used to capture the plurality of images of the user's vicinity.

At 559, a triangulation analysis may be applied to the selected cluster of 3D points to determine a location of the user observing the queried keypoints. In one embodiment, the triangulation analysis may be enhanced by using an optimization framework to triangulate from an arbitrary number of points (at least two) while minimizing error. In another embodiment, the triangulation analysis may be enhanced by triangulating from all pairs of keypoints and taking the center of mass from the resulting keypoints.

At 560, the user's exact location within the wardrived (or pre-mapped) environment may be ascertained in accordance with the disclosed method.

In one embodiment, additional probabilistic data structures (e.g., additional Bloom filters) may be used to increase the discerning power of the methods disclosed herein. For example, in a scenario where a scene is relatively boring and no particular keypoint is highly unique, a pair or a triplet of keypoints may be differentiating. In an exemplary scenario, 100 keypoints in an image (out of 10,000 keypoints in the image) may meet a $75^{th}$ percentile uniqueness criterion, but not the $90^{th}$ percentile. The discerning power of the methods disclosed herein may be "boosted" by testing those 100 keypoints×100 keypoints=10,000 pairs of keypoints, which may result in, say, 10 keypoints meeting a $90^{th}$ percentile uniqueness criterion, but not the $95^{th}$ percentile. The discerning power of the methods disclosed herein may be further "boosted" by testing those 10 keypoints×10 keypoints×10 keypoints=1,000 triplets of keypoints, which may result in, say, one or more keypoints meeting a $95^{th}$ percentile uniqueness criterion. In another example, with X and Y keypoints, both pairs XIY and YIX may be tested. In one embodiment, pairs (or triplets) of keypoints may be tested according to a metric that may order the keypoints according to the dimensions of each keypoint. For example, a simple strawman approach may be used for high-dimension keypoints, e.g., when a keypoint is represented by X=[x0, x1, ... x127], a Sum x_i or Sum (x_i)$^i$ may be computed.

In a further embodiment, a probabilistic data structure (e.g., a Bloom filter) may encode positional constraints on multiple keypoints (e.g., triplets of keypoints). For example, in a scenario with a triplet of keypoints, X, Y, Z, a constraint could be without loss of generality (w.l.o.g.) that X, Y are closer than X, Z. In another example, a Bloom filter may encode (w.l.o.g.) that the angle X, Y, Z is larger than the angle Y, Z, X.

In one embodiment, each additional probabilistic data structure test (e.g., Bloom filter test) may be O(1). In one embodiment, each additional probabilistic data structure test (e.g., Bloom filter test) may be performed as a parallelized test.

In one embodiment, identification of the user's location may include providing additional probabilistic data structures and receiving a number of matching feature characteristics stored in the additional probabilistic data structures that respectively correspond to each of at least two feature characteristics from the plurality of feature characteristics. For example, if ambiguity exists after a global data store is queried, the method disclosed herein may include providing relatively smaller and dynamically generated Bloom filters to be used to disambiguate between two or more ambiguous keypoints (or clusters of keypoints). In such a scenario, a server may generate and provide such Bloom filters to a user's mobile device. The user may test each ambiguous keypoint against the additional Bloom filters. Each additional Bloom filter may return a number of matching keypoints for each ambiguous keypoint, which may be used to disambiguate between two or more possible location clusters. For example, the additional Bloom filter representing the cluster with the most matched keypoints may be the disambiguated location.

Furthermore, it is contemplated that in some embodiments, the above methods and systems may be used with a single image of the user's vicinity. In such embodiments, the single image may contain one or more highly unique feature characteristics (e.g., keypoints).

The methods and systems disclosed herein may be used on or include conventional (off the shelf) mobile devices that do not require hardware modification or requiring deployed infrastructure.

In one embodiment, the methods and systems disclosed herein include determining and analyzing feature characteristics (e.g., keypoints, feature vectors, etc.) that are "globally-unique," i.e., which are highly unique across many images. In another embodiment, the (global) uniqueness of any keypoint in an image may be determined and expressed in a compact form using the probabilistic data structures disclosed herein (e.g., Bloom filters). In another embodiment, the methods and systems disclosed herein may be used to provide indoor localization service through queries of only the most unique keypoints extracted from images of a user's vicinity.

The probabilistic data structures may be designed to quickly and efficiently determine the presence of an element within a set of elements at the trade-off of returning false positive results. In one embodiment, the probabilistic data structure is a space-efficient probabilistic data structure that may return either a true negative result or a positive result that is either a true positive or a false positive for presence of an element in the probabilistic data structure. In one embodiment, the probabilistic data structure is a Bloom filter.

In one embodiment, the method disclosed herein further includes providing a plurality of first data structures, and each of the first data structures from the plurality of first data structures is a probabilistic data structure (e.g., a Bloom filter) derived from the second data structure (e.g., a global data store).

In one embodiment, the initial plurality of feature characteristics extracted from one or more images of the user's vicinity is extracted by an image feature detecting algorithm. In one embodiment, the image feature detecting algorithm is selected from the group consisting of scale-invariant feature transform (SIFT), speeded up robust features (SURF), and features from accelerated segment test (FAST).

In one embodiment, the corresponding feature characteristics stored in the second data structure are 3D keypoints extracted from a multiplicity of images of the pre-mapped environment. In one embodiment, the second data structure contains 3D keypoints extracted from a multiplicity of images of a plurality of pre-mapped environments. In one embodiment, the first data structure is derived from the second structure by querying the second data structure for a number of corresponding 3D keypoints that respectively correspond to each 3D keypoint stored in the second data structure, analyzing a distribution of the number of corresponding 3D keypoints to determine threshold values for predetermined quantiles, and generating the first data structure based on the threshold value for one of the predetermined quantiles.

In one embodiment, the second data structure is provided in a cloud computing environment.

According to one embodiment, a method for determining a user's location in a pre-mapped environment from one or more images of the user's vicinity includes receiving a first plurality of feature characteristics extracted from the one or more images of the user's vicinity, querying a first data structure for a number of first corresponding feature characteristics that respectively correspond to each feature characteristics from the first plurality of feature characteristics, generating a ranked list of each feature characteristics form the first plurality of feature characteristics having a non-zero number of the first corresponding feature characteristics, selecting a second plurality of feature characteristics from the ranked list, querying a second data structure for second corresponding feature characteristics that respectively correspond to each feature characteristics from the second plurality of feature characteristics, and identifying the user's location in the pre-mapped environment from the second corresponding feature characteristics. The first data structure may be a probabilistic data structure derived from the second data structure, the ranked list may be based on the number of the first corresponding feature characteristics, and the second plurality of feature characteristics may be a subset containing feature characteristics from the first plurality of feature characteristics having a least number of first corresponding features.

According to one embodiment, a method for determining a user's location in a pre-mapped environment from one or more images of the user's vicinity includes extracting a first plurality of feature characteristics extracted from the one or more images of the user's vicinity, querying a first data structure for a number of first corresponding feature characteristics that respectively correspond to each feature characteristics from the first plurality of feature characteristics, generating a ranked list of each feature characteristics form the first plurality of feature characteristics having a non-zero number of the first corresponding feature characteristics, selecting a second plurality of feature characteristics from the ranked list, querying a second data structure for second corresponding feature characteristics that respectively correspond to each feature characteristics from the second plurality of feature characteristics, and receiving the user's location in the pre-mapped environment from the second corresponding feature characteristics. The first data structure may be a probabilistic data structure derived from the second data structure, the ranked list may be based on the number of the first corresponding feature characteristics, and the second plurality of feature characteristics may be a subset containing feature characteristics from the first plurality of feature characteristics having a least number of first corresponding features.

It is understood in advance that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows. On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows. Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows. Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure comprising a network of interconnected nodes.

Figure 8:
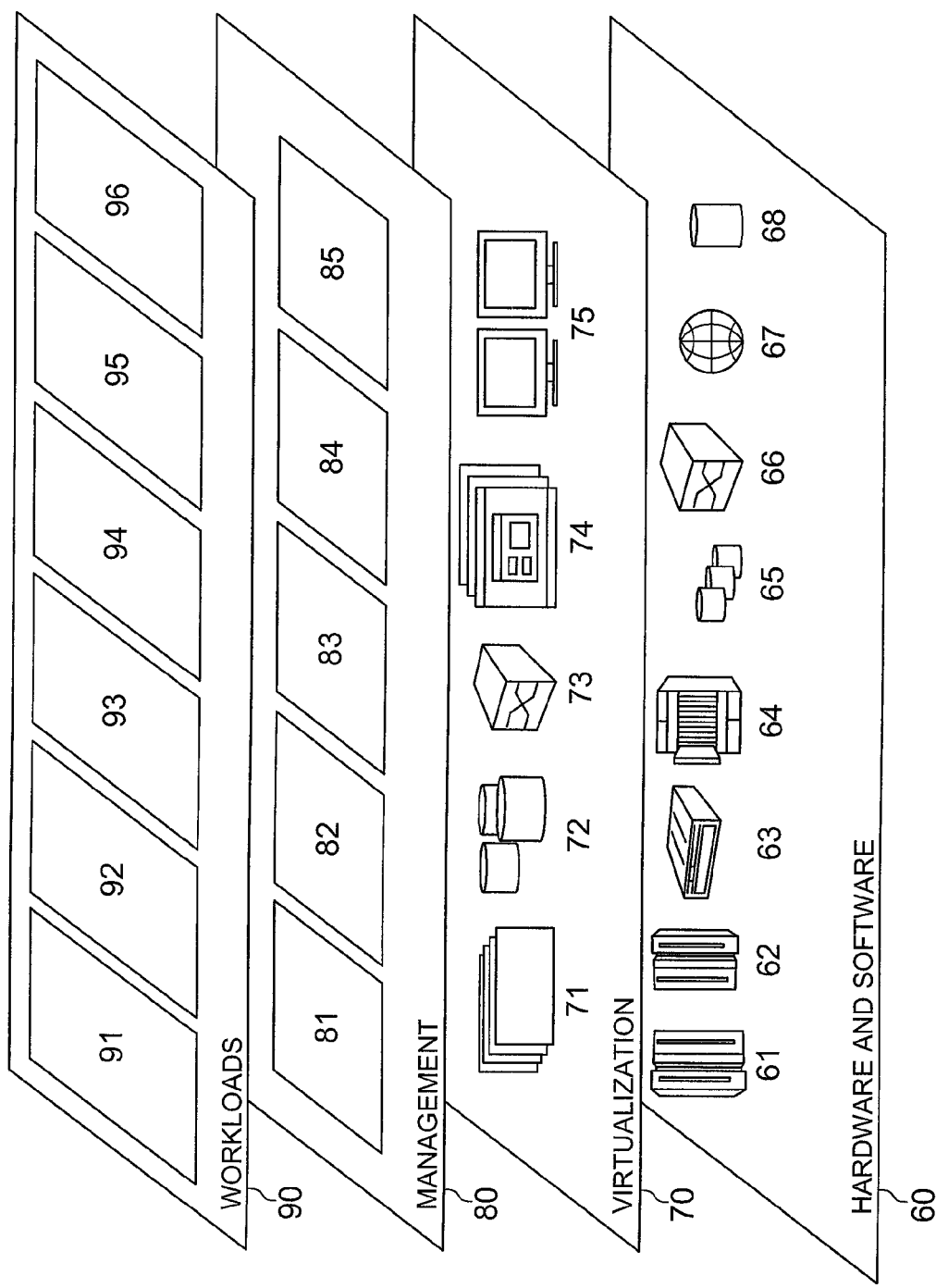
FIG. 8 depicts abstraction model layers, according to an embodiment.

Referring now to FIG. 8, a schematic of an example of a cloud computing node is shown. Cloud computing node 10 is only one example of a suitable cloud computing node and is not intended to suggest any limitation as to the scope of use or functionality of embodiments of the invention described herein. Regardless, cloud computing node 10 is capable of being implemented and/or performing any of the functionality set forth hereinabove.

In cloud computing node 10 there is a computer system/server 12, which is operational with numerous other general purpose or special purpose computing system environments or configurations. Examples of well-known computing systems, environments, and/or configurations that may be suitable for use with computer system/server 12 include, but are not limited to, personal computer systems, server computer systems, thin clients, thick clients, hand-held or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 12 may be described in the general context of computer system-executable instructions, such as program modules, being executed by a computer system. Generally, program modules may include routines, programs, objects, components, logic, data structures, and so on that perform particular tasks or implement particular abstract data types. Computer system/server 12 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 8, computer system/server 12 in cloud computing node 10 is shown in the form of a general-purpose computing device. The components of computer system/server 12 may include, but are not limited to, one or more processors or processing units 16, a system memory 28, and a bus 18 that couples various system components including system memory 28 to processor 16.

Bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system/server 12 typically includes a variety of computer system readable media. Such media may be any available media that is accessible by computer system/server 12, and it includes both volatile and non-volatile media, removable and non-removable media.

System memory 28 can include computer system readable media in the form of volatile memory, such as random access memory (RAM) 30 and/or cache memory 32. Computer system/server 12 may further include other removable/non-removable, volatile/non-volatile computer system storage media. By way of example only, storage system 34 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 18 by one or more data media interfaces. As will be further depicted and described below, memory 28 may include at least one program product having a set (e.g., at least one) of program modules that are configured to carry out the functions of embodiments of the invention.

Program/utility 40, having a set (at least one) of program modules 42, may be stored in memory 28 by way of example, and not limitation, as well as an operating system, one or more application programs, other program modules, and program data. Each of the operating system, one or more application programs, other program modules, and program data or some combination thereof, may include an implementation of a networking environment. Program modules 42 generally carry out the functions and/or methodologies of embodiments of the invention as described herein.

Computer system/server 12 may also communicate with one or more external devices 14 such as a keyboard, a pointing device, a display 24, etc.; one or more devices that enable a user to interact with computer system/server 12; and/or any devices (e.g., network card, modem, etc.) that enable computer system/server 12 to communicate with one or more other computing devices. Such communication can occur via Input/Output (I/O) interfaces 22. Still yet, computer system/server 12 can communicate with one or more networks such as a local area network (LAN), a general wide area network (WAN), and/or a public network (e.g., the Internet) via network adapter 20. As depicted, network adapter 20 communicates with the other components of computer system/server 12 via bus 18. It should be understood that although not shown, other hardware and/or software components could be used in conjunction with computer system/server 12. Examples, include, but are not limited to: microcode, device drivers, redundant processing units, external disk drive arrays, RAID systems, tape drives, and data archival storage systems, etc.

Referring now to FIG. 9, illustrative cloud computing environment 50 is depicted. As shown, cloud computing environment 50 comprises one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 9 are intended to be illustrative only and that computing nodes 10 and cloud computing environment 50 can communicate with any type of computerized device over any type of network and/or network addressable connection (e.g., using a web browser).

Referring now to FIG. 10, a set of functional abstraction layers provided by cloud computing environment 50 (FIG. 9) is shown. It should be understood in advance that the components, layers, and functions shown in FIG. 10 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and image localization processing 96.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Detailed embodiments of the claimed structures and methods are disclosed herein; however, it can be understood that the disclosed embodiments are merely illustrative of the claimed structures and methods that may be embodied in various forms. This invention may, however, be embodied in many different forms and should not be construed as limited to the exemplary embodiments set forth herein. Rather, these exemplary embodiments are provided so that this disclosure will be thorough and complete and will fully convey the scope of this invention to those skilled in the art. In the description, details of well-known features and techniques may be omitted to avoid unnecessarily obscuring the presented embodiments.

References in the specification to "one embodiment", "an embodiment", "an example embodiment", etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the invention. The terminology used herein was chosen to best explain the principles of the embodiment, the practical application or technical improvement over technologies found in the marketplace, or to enable others of ordinary skill in the art to understand the embodiments disclosed herein.

What is claimed is:

1. A method for determining a user's location in a pre-mapped environment from one or more images of the user's vicinity, the method comprising:
   providing a first data structure, wherein the first data structure is a probabilistic data structure derived from a second data structure;
   querying the second data structure for corresponding feature characteristics stored in the second data structure that respectively correspond to each feature characteristic from a plurality of feature characteristics,
      wherein the plurality of feature characteristics is a subset of an initial plurality of feature characteristics extracted from the one or more images of the user's vicinity, and
      wherein the plurality of feature characteristics is determined by queries to the first data structure; and
   identifying the user's location in the pre-mapped environment from the corresponding feature characteristics.

2. The method according to claim 1, wherein determining the plurality of feature characteristics by queries to the first data structure comprises:
   querying the first data structure for a number of initial corresponding feature characteristics stored in the first data structure that respectively correspond to each feature characteristic from the initial plurality of feature characteristics;
   generating a ranked list of each feature characteristic having a non-zero number of initial corresponding feature characteristics; and
   selecting the plurality of feature characteristics from the ranked list,
   wherein the plurality of feature characteristics contains feature characteristics from the initial plurality of feature characteristics having a least number of initial corresponding feature characteristics.

3. The method according to claim 1, wherein the probabilistic data structure is a Bloom filter.

4. The method according to claim 1, wherein identifying the user's location in the pre-mapped environment from the corresponding feature characteristics comprises:
applying a spatial clustering analysis to the corresponding feature characteristics.

5. The method according to claim 4, wherein identifying the user's location in the pre-mapped environment from the corresponding feature characteristics further comprises:
determining an angle of observation with which the user observed each of the feature characteristics from the initial plurality of feature characteristics that corresponds to the corresponding feature characteristics.

6. The method according to claim 4, wherein identifying the user's location in the pre-mapped environment from the corresponding feature characteristics further comprises:
applying a triangulation analysis to the corresponding feature characteristics.

7. The method according to claim 1, further comprising:
providing a plurality of first data structures, wherein each of the first data structures from the plurality of first data structures is a probabilistic data structure derived from the second data structure.

8. The method according to claim 1, wherein the initial plurality of feature characteristics extracted from the one or more images of the user's vicinity is extracted by an image feature detecting algorithm.

9. The method according to claim 8, wherein the image feature detecting algorithm is selected from the group consisting of scale-invariant feature transform (SIFT), speeded up robust features (SURF), and features from accelerated segment test (FAST).

10. The method according to claim 1, wherein the corresponding feature characteristics stored in the second data structure are three-dimensional (3D) keypoints extracted from a multiplicity of images of the pre-mapped environment.

11. The method according to claim 1, wherein the second data structure contains three-dimensional (3D) keypoints extracted from a multiplicity of images of a plurality of pre-mapped environments.

12. The method according to claim 10, wherein deriving the first data structure from the second data structure comprises:
querying the second data structure for a number of corresponding 3D keypoints that respectively correspond to each 3D keypoint stored in the second data structure;
analyzing a distribution of the number of corresponding 3D keypoints to determine threshold values for predetermined quantiles; and
generating the first data structure based on the threshold value for one of the predetermined quantiles.

13. The method according to claim 1, wherein the second data structure is provided in a cloud computing environment.

14. The method according to claim 1, wherein identifying the user's location in the pre-mapped environment from the corresponding feature characteristics comprises:
providing additional probabilistic data structures; and
receiving a number of matching feature characteristics stored in the additional probabilistic data structures that respectively correspond to each of at least two feature characteristics from the plurality of feature characteristics.

15. A computer program product for determining a user's location in a pre-mapped environment from one or more images of the user's vicinity, the computer program product comprising at least one computer readable non-transitory storage medium having computer readable program instructions thereon for execution by a processor, the computer readable program instructions comprising program instructions for:
providing a first data structure, wherein the first data structure is a probabilistic data structure derived from a second data structure;
querying the second data structure for corresponding feature characteristics stored in the second data structure that respectively correspond to each feature characteristic from a plurality of feature characteristics,
wherein the plurality of feature characteristics is a subset of an initial plurality of feature characteristics extracted from the one or more images of the user's vicinity, and
wherein the plurality of feature characteristics is determined by queries to the first data structure; and
identifying the user's location in the pre-mapped environment from the corresponding feature characteristics.

16. The computer program product according to claim 15, wherein determining the plurality of feature characteristics by queries to the first data structure comprises:
querying the first data structure for a number of initial corresponding feature characteristics stored in the first data structure that respectively correspond to each feature characteristic from the initial plurality of feature characteristics;
generating a ranked list of each feature characteristic having a non-zero number of initial corresponding feature characteristics; and
selecting the plurality of feature characteristics from the ranked list,
wherein the plurality of feature characteristics contains feature characteristics from the initial plurality of feature characteristics having a least number of initial corresponding feature characteristics.

17. The computer program product according to claim 15, wherein the probabilistic data structure is a Bloom filter.

18. A computer system for determining a user's location in a pre-mapped environment from one or more images of the user's vicinity the computer system comprising:
at least one processor;
at least one computer readable memory;
at least one computer readable tangible, non-transitory storage medium; and;
program instructions stored on the at least one computer readable tangible, non-transitory storage medium for execution by the at least one processor via the at least one computer readable memory, wherein the program instructions comprise program instructions for:
providing a first data structure, wherein the first data structure is a probabilistic data structure derived from a second data structure;
querying the second data structure for corresponding feature characteristics stored in the second data structure that respectively correspond to each feature characteristic from a plurality of feature characteristics, wherein the plurality of feature characteristics is a subset of an initial plurality of feature characteristics extracted from the one or more images of the user's vicinity, and wherein the plurality of feature characteristics is determined by queries to the first data structure; and identifying the user's location in the pre-mapped environment from the corresponding feature characteristics.

19. The computer system according to claim 18, wherein determining the plurality of feature characteristics by queries to the first data structure comprises:

querying the first data structure for a number of initial corresponding feature characteristics stored in the first data structure that respectively correspond to each feature characteristic from the initial plurality of feature characteristics;

generating a ranked list of each feature characteristic having a non-zero number of initial corresponding feature characteristics; and selecting the plurality of feature characteristics from the ranked list, wherein the plurality of feature characteristics contains feature characteristics from the initial plurality of feature characteristics having a least number of initial corresponding feature characteristics.

20. The computer system according to claim 18, wherein the probabilistic data structure is a Bloom filter.

* * * * *